United States Patent [19]

Dreessen et al.

[11] Patent Number: 5,404,238

[45] Date of Patent: Apr. 4, 1995

[54] FLASHLIGHT ILLUMINATING APPARATUS FOR A MICROSCOPE

[75] Inventors: Jörg Dreessen, Hanover; Arthur Konnerth, Goettingen, both of Germany

[73] Assignee: Max-Planck-Gesellschaft zur Foerderung der Wissenschaften e.V., Goettingen, Germany

[21] Appl. No.: 938,382

[22] Filed: Aug. 31, 1992

[30] Foreign Application Priority Data

Sep. 3, 1991 [DE] Germany .................. 91 10 926 U

[51] Int. Cl.⁶ .................................................. G02B 21/06
[52] U.S. Cl. .................................. 359/385; 362/32; 362/293; 385/31; 385/88
[58] Field of Search .................. 359/372, 385–387, 359/389–390, 891, 892, 368–371, 388; 385/31–33, 77, 88, 92–93, 119, 89–91; 362/268, 293, 296, 32

[56] References Cited

U.S. PATENT DOCUMENTS

| | | | |
|---|---|---|---|
| 3,096,767 | 7/1963 | Gresser et al. | 359/389 |
| 4,006,487 | 2/1977 | Allen | 354/79 |
| 4,911,543 | 3/1990 | Hodgson | 359/385 |

FOREIGN PATENT DOCUMENTS 9000754  1/1990  WIPO .................. 359/368

Primary Examiner—Loha Ben
Assistant Examiner—James Phan
Attorney, Agent, or Firm—Nields & Lemack

[57] ABSTRACT

Illuminating apparatus for a microscope including a semitransparent, in particular dichroic, microscope mirror for reflecting illuminating light from an external illuminating unit into a microscope beam path. The illuminating unit comprises a coupling-in unit having a first beam path which leads from a light exit end of a first optical waveguide through a semitransparent coupling-in mirror and an adapter optical system to the microscope mirror, furthermore, a second beam path which leads from a light exit end of a second optical waveguide via the semitransparent coupling-in mirror operating in reflection and the adapter optical system to the microscopic mirror, a first light source unit which is optically coupled to a light entrance end of the first optical waveguide and a second light source unit for flashlight which is optically coupled to a light entrance end of the second optical waveguide.

12 Claims, 1 Drawing Sheet

FLASHLIGHT ILLUMINATING APPARATUS FOR A MICROSCOPE

FIELD OF THE INVENTION

The present invention relates to an illuminating apparatus; for a microscope.

DESCRIPTION OF THE RELATED ART

It is known in microbiological investigations to use photo-activatable substances, in particular so-called caged compounds (e.g. $Ca^{++}$ (nitr-5, DM-nitrophene, diazo-2), cAMP, cGMP, $IP_3$, etc.). To transform these substances to their biologically active form illumination with a high-energy UV flash is necessary.

Hitherto, for this purpose a flashlight illuminating apparatus arranged directly at the microscope was used which furnishes a flashlight beam incident past the microscope objective obliquely on the specimen. This has various disadvantages: Firstly, the space at the microscope is undesirably restricted by the relatively voluminous flashlamp illuminating unit. Since the light is incident obliquely on the specimen usually disposed in a perfusion liquid and the angle of incidence is close to the angle for total reflection, the small light yield with an upright microscope with reflected illumination is not satisfactory. Frequently, simultaneously with the calcium determination by the photoactivatable substances electrical derivations from cells are also to be carried out; however, disturbances then occur due to crosstalk from the flash unit to the relatively sensitive measuring electronics for detecting the derived electrical signals. A direct radiating-in of the UV flash by means of a quartz fibre light guide, the exit end of which is arranged close to the specimen, would have the disadvantage that the flash spot on the specimen would be undesirably large due to the high numerical aperture of UV transparent quartz fibres and in addition constant readjustment would be necessary.

Fluorescence microscopes usually include a dichroic mirror for reflecting illuminating light in the microscope beam path which has a shorter wavelength than the measuring light originating from the specimen investigated.

SUMMARY OF THE INVENTION

The present invention is accordingly based on the problem of providing a flashlight illuminating apparatus which does not appreciably restrict the space at the microscope and permits a high illumination strength at the specimen as well as specific illumination of the specimen.

The invention provides an improved illuminating apparatus for a microscope, the latter including a semitransparent microscope mirror for reflecting illuminating light from an external illuminating unit into a microscope beam path. According to a preferred embodiment of the invention the illuminating apparatus comprises a coupling-in unit having a first beam path which leads from a light exit end of a first optical waveguide through a semitransparent coupling-in mirror and an adapter optical system to the microscope mirror, furthermore a second beam path which leads from a light exit end of a second optical waveguide via the semitransparent coupling-in mirror operating in reflection and the adapter optical system to the microscope mirror, a first light source unit which is optically coupled to a light entrance end of the first optical waveguide and a second light source unit for flashlight which is optically coupled to a light entrance end of the second optical waveguide.

With the present illuminating apparatus a high light yield and thus a high illumination strength is achieved. In advantageous embodiments of the invention the location and magnitude of the illuminated region can be simply adjusted. The space at the microscope, preferably an upright microscope, is not appreciably restricted. There is no necessity for readjustments of the illumination apparatus.

The present illuminating apparatus can be advantageously used for biological investigations, for example for selective liberation of caged compounds in specific regions of a nerve cell, for example a dendritic branch. Simultaneously executed potential derivations and location-selective calcium determinations can be carried out without disturbances.

BRIEF DESCRIPTION OF THE DRAWINGS

Hereinafter a preferred embodiment of the present illuminating apparatus will be described in detail with reference to the drawings, wherein.

DESCRIPTION OF THE PREFERRED EMBODIMENT

Figure 1:
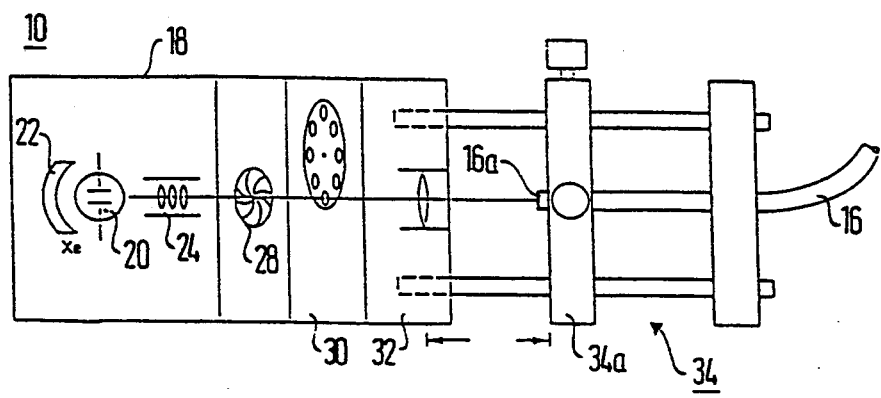
FIG. 1 shows a light source unit for the present illuminating apparatus and FIG. 2 a light coupling-in unit which is associated with a microscope only partially illustrated.

The preferred embodiment of the illuminating apparatus according to the invention illustrated in the drawings permits both activation of photoactivatable compounds, such as caged compounds, by high-energy UV radiation flashes, and at the same time an imagewise acquisition of the calcium ion concentration in the specimen with high time resolution and if desired simultaneous electrical potential measurements on the specimen. To make this possible, the present preferred embodiment of the illuminating apparatus includes at least two light source units 10 (FIG. 1) which are each optically coupled via a flexible optical waveguide 16 to a coupling-in unit 12 (FIG. 2) which is associated with an only schematically illustrated microscope 14 and represents the most significant part of the present invention.

The light source unit for the flashlight illumination and the light source units for the illumination of the specimen with visible UV radiation for fluorescence stimulation of calcium indicators will all be explained with reference to FIG. 1. Generally, each light source unit 10 includes a commercially available lamp housing 18 in which a light source 20 and an associated optical system 24 are disposed. Furthermore, each light source unit 10 includes an adapter 32 having a lens for focussing the radiation of the light source 20 into a light entrance end 16a of an associated optical waveguide 16 which in the present embodiment consists of a quartz monofibre having a diameter of 1.2 mm. The light entrance end 16a of the optical waveguide 16 is adjustably mounted in the transverse direction of the beam path and longitudinally thereof by means of an x-y adjustment unit 34a which is part of an optical bench 34.

The light source unit for the flashlight illumination includes as light source 20 a xenon flashtube which is coupled to a power supply (not illustrated) of conventional type. The optical system illustrated only schematically in FIG. 1 includes in this case a quartz condenser, a UV filter and a quartz objective. A light shutter 28 may be provided between the lamp housing 18 and the adapter 32.

In the light source unit or units for the fluorescence illumination the light source 20 consists of a xenon high-pressure lamp behind which a concave mirror 22 is arranged. The optical system 24 is a quartz condenser. In the beam path in front of the adapter 32 an optical filter (not illustrated) may be provided and in the illumination apparatus for UV stimulation a filter changer 30 is also provided which may for example include a motor-driven filter wheel in which filters with different transmission range are disposed which on rotation of the filter wheel are moved in rapid succession into the illumination beam path.

Figure 2:
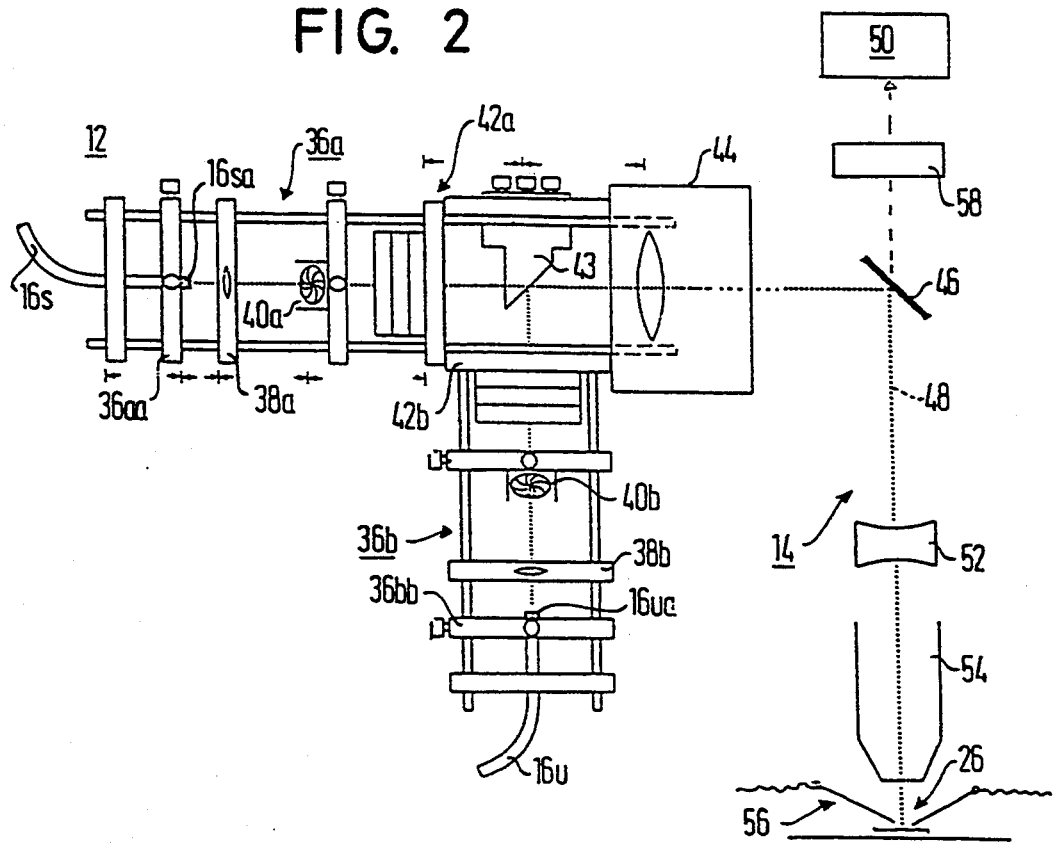

The coupling-in unit 12 illustrated in FIG. 2 is coupled on the light-entrance side to two fiber light guides 16s and 16u. The fiber light guide 16s leads to a fluorescence illuminating unit 10 which serves to generate light in the spectral range between 400 nm and for example 520 nm for fluorescence stimulation of a calcium ion indicator reacting to visible light, for example fluo-3, which is stimulatable with light of 470 nm. The light exit end of the light guide 16s is mounted in an x-y adjustment device 36aa which is part of an optical bench 36a and permits adjustment of the light exit end 16sa in the transverse direction of the beam path and longitudinally thereof. The optical bench 36a further includes along the beam path a lens 38a, an iris diaphragm 40a acting as field of view diaphragm, and a filter holder 42a. The beam path of the visible light then runs through a dichroic mirror 43 which transmits radiation with a wavelength above 400 nm but reflects radiation with a wavelength below 400 nm. The beam path of the visible light then passes through an adapter 44 including a lens and the visible light is then reflected through a Telan lens 52 and the microscope objective 54 onto the specimen by a semitransparent mirror 46, in particular a dichroic mirror, which is arranged in the microscope beam path 48 and which reflects light with a wavelength below 520 nm and allows light of longer wavelength to pass.

The optical waveguide 16u connected to the flashlamp illuminating unit described above, which may also be a quartz monofibre of the type referred to above, is held with its light exit end 16ua in an x-y adjustment device 36b which is followed by a lens 38b as well as an iris diaphragm 40b and a filter holder 42b which are mounted like the corresponding elements in the beam path of the visible light on an optical bench 36b. The beam path of the UV light is then incident on the dichroic mirror 43 and is reflected by the latter through the adapter lens 44, then following the beam path of the visible light described above, i.e. it is deflected by the semitransparent mirror 46 through the Telan lens 52 and the microscope objective 54 onto the specimen. The light eminating from the specimen passes through the microscope objective 54, the Telan lens 52 and the semitransparent mirror 46 to an image acquisition system 50 which can contain an electronic camera connected to an electronic image-processing system or an eyepiece.

To protect the electronic camera from overloading by reflected flashlight, in the beam path between the semitransparent mirror 46 and the image acquisition means 50 a quick-action shutter 58 is provided which can be synchronized in a manner not illustrated with the power supply of the flashlamp and momentarily closed for the duration of a flash.

Since due to the optical waveguides the light source units can be arranged at adequate distance from the microscope 14, there is no danger of disturbances due to mechanical vibrations or electrical interference pulses. Consequently, potential measurements can also be carried out with fine electrodes 56, only schematically illustrated, simultaneously with an imagewise acquisition of the calcium ion concentration in real time.

If it is not desired to operate with flashlight-activated substances of the type mentioned at the beginning, but to employ a calcium determination with a UV-activatable indicator, such as Fura-2, instead of the Ca indicator activatable with visible light, the optical waveguide 16u is connected at the entrance side to a fluorescence illuminating unit 10 which is modified for UV radiation and the filter changer of which contains corresponding UV filters.

We claim:

1. Illuminating apparatus for a microscope, said microscope including a semitransparent microscope mirror for reflecting an illuminating light from an external illuminating unit into a microscope beam path, said apparatus comprising:

a coupling-in unit having a first beam path extending from a light exit end of a first optical fiber waveguide through a semitransparent coupling-in mirror and an adapter optical system to the microscope mirror, and a second beam path which leads from a light exit end of a second fiber optical waveguide via the semitransparent coupling-in mirror operating in reflection and the adapter optical system to the microscope mirror, a first light source unit which is optically coupled to a light entrance end of the first optical waveguide, and a second light source unit having a high-energy UV radiation flash which is optically coupled to a light entrance end of the second optical waveguide, wherein said first light source is spaced and mechanically separated from said coupling-in unit by said first fiber optical waveguide, and said second light source is spaced and mechanically separated from said coupling-in unit by said second fiber optical waveguide.

2. Illuminating apparatus for a microscope, said microscope including a semitransparent microscope mirror for reflecting an illuminating light from an external illuminating unit into a microscope beam path, said apparatus comprising:

a coupling-in unit having a first beam path extending from a light exit end of a first optical waveguide through a semitransparent coupling-in mirror and an adapter optical system to the microscope mirror, and a second beam path which leads from a light exit end of a second optical waveguide via the semitransparent coupling-in mirror operating in reflection and the adapter optical system to the microscope mirror, a first light source unit which is optically coupled to a light entrance end of the first optical waveguide, and a second light source unit having a high-energy UV radiation flash which is optically coupled to a light entrance end of the second optical waveguide, wherein said semitransparent coupling-in mirror is a dichroic mirror designed for reflection of light having a wavelength below about 400 nm, said first light source unit includes a light source having a relatively long-wavelength which is transmitted by the dichroic coupling-in mirror, said second light source unit contains a light source having a relatively short-wavelength which is reflected by the dichroic coupling-in mirror, and said microscope mirror is a dichroic mirror designed for the reflection of light having a wavelength below about 520 nm.

3. Illuminating unit for a microscope, said microscope including a semitransparent microscope mirror for reflecting an illuminating light from an external illuminating unit into a microscope beam path, said apparatus comprising:

a coupling-in unit having a first beam path extending from a light exit end of a first optical waveguide through a semitransparent coupling-in mirror and an adapter optical system to the microscope mirror, and a second beam path which leads from a light exit end of a second optical waveguide via the semitransparent coupling-in mirror operating in reflection and the adapter optical system to the microscope mirror, a first light source unit which is optically coupled to a light entrance end of the first optical waveguide, and a second light source unit having a high-energy UV radiation flash which is optically coupled to a light entrance end of the second optical waveguide, and a filter changer and a coupling-in optical system which are arranged in the first light source unit between a light source and the light entrance end of the first optical waveguide.

4. The illuminating unit according to claim 3, wherein said second light source unit includes a flashlamp.

5. The illuminating unit according to claim 4, wherein said microscope mirror is a dichroic mirror designed for the reflection of light having a wavelength below about 520 nm and said coupling-in mirror is a dichroic mirror designed for reflection of light having a wavelength below about 400 nm.

6. Illuminating apparatus for a microscope, said microscope including a semitransparent microscope mirror for reflecting an illuminating light from an external illuminating unit into a microscope beam path, said apparatus comprising:

a coupling-in unit having a first beam path extending from a light exit end of a first optical waveguide through a semitransparent coupling-in mirror and an adapter optical system to the microscope mirror, and a second beam path which leads from a light exit end of a second optical waveguide via the semitransparent coupling-in mirror operating in reflection and the adapter optical system to the microscope mirror, a first light source unit which is optically coupled to a light entrance end of the first optical waveguide, and a second light source unit having a high-energy UV radiation flash which is optically coupled to a light entrance end of the second optical waveguide, and an optical diaphragm which is arranged in the coupling-in unit in the first beam path between the light exit end of the first optical waveguide and the coupling-in mirror.

7. Illuminating apparatus according to claim 6, further comprising a device for mounting the diaphragm adjustably transversely of the associated beam path.

8. The illuminating apparatus according to claim 6, further comprising an optical diaphragm which is arranged in the second beam path between the light exit end of the second optical waveguide and the coupling-in mirror.

9. Illuminating apparatus for a microscope, said microscope including a semitransparent microscope mirror for reflecting an illuminating light from an external illuminating unit into a microscope beam path, said apparatus comprising:

a coupling-in unit having a first beam path extending from a light exit end of a first optical waveguide through a semitransparent coupling-in mirror and an adapter optical system to the microscope mirror, and a second beam path which leads from a light exit end of a second optical waveguide via the semitransparent coupling-in mirror operating in reflection and the adapter optical system to the microscope mirror, a first light source unit which is optically coupled to a light entrance end of the first optical waveguide, and a second light source unit having a high-energy UV radiation flash which is optically coupled to a light entrance end of the second optical waveguide, and an optical diaphragm which is arranged in the second beam path between the light exit end of the second optical waveguide and the coupling-in mirror.

10. Illuminating apparatus according to claim 9, further comprising a device for mounting the diaphragm adjustably transversely of the associated beam path.

11. Illuminating apparatus for a microscope, said microscope including a semitransparent microscope mirror for reflecting an illuminating light from an external illuminating unit into a microscope beam path, said apparatus comprising:

a coupling-in unit having a first beam path extending from a light exit end of a first optical waveguide through a semitransparent coupling-in mirror and an adapter optical system to the microscope mirror, and a second beam path which leads from a light exit end of a second optical waveguide via the semitransparent coupling-in mirror operating in reflection and the adapter optical system to the microscope mirror, a first light source unit which is optically coupled to a light entrance end of the first optical waveguide, and a second light source unit having a high-energy UV radiation flash which is optically coupled to a light entrance end of the second optical waveguide, and a filter changer and a coupling-in optical system which are arranged in the first light source unit between a light source and the light entrance end of the first optical waveguide, an optical diaphragm which is arranged in the coupling-in unit in the first beam path between the light exit end of the first optical waveguide and the coupling-in mirror, and an optical diaphragm which is arranged in the second beam path between the light exit end of the second optical waveguide and the coupling-in mirror.

12. The illuminating apparatus according to claim 11, wherein said microscope mirror is a dichroic mirror designed for the reflection of light having a wavelength below about 520 nm and said coupling-in mirror is a dichroic mirror designed for reflection of light having a wavelength below about 400 nm.

* * * * *